United States Patent [19]
Taylor et al.

[11] 4,159,248
[45] Jun. 26, 1979

[54] CATCH BASIN PROCESSING APPARATUS

[75] Inventors: Lauren P. Taylor, Swarthmore; Alex Petroski, Springfield, both of Pa.

[73] Assignee: LRS Research, Ltd., Broomall, Pa.

[21] Appl. No.: 885,683

[22] Filed: Mar. 13, 1978

Related U.S. Application Data

[63] Continuation-in-part of Ser. No. 812,483, Jul. 5, 1977, which is a continuation-in-part of Ser. No. 709,566, Jul. 26, 1976, Pat. No. 4,040,960.

[51] Int. Cl.² .............................................. B01D 21/00
[52] U.S. Cl. ..................................... 210/96.1; 210/103; 210/105; 210/202; 210/241; 210/258; 210/386; 210/195.3
[58] Field of Search ........................... 210/10, 59–61, 210/65, 66, 69, 70, 73 R, 77, 78, 86–88, 96 R, 97, 98, 103, 105, 194, 195 R, 196, 197, 198 R, 199–202, 205, 206, 170, 241, 252, 258, 260, 386, 400

[56] References Cited

U.S. PATENT DOCUMENTS

| | | | |
|---|---|---|---|
| 1,331,239 | 2/1920 | Cartwright | 210/241 |
| 3,128,786 | 4/1964 | Badgett | 210/96 R |
| 3,262,571 | 7/1966 | Petretti | 210/241 |
| 3,399,133 | 8/1968 | Gerdes et al. | 210/96 R |
| 3,459,122 | 8/1969 | Pastoors et al. | 210/400 |
| 3,630,365 | 12/1971 | Woodbridge et al. | 210/241 |
| 3,659,712 | 5/1972 | Chaplin | 210/96 R |
| 3,800,952 | 4/1974 | Bastgen | 210/400 |
| 3,979,296 | 9/1976 | Bastgen | 210/386 |
| 4,019,431 | 4/1977 | Bastgen | 210/386 |
| 4,040,960 | 8/1977 | Taylor et al. | 210/96 R |

FOREIGN PATENT DOCUMENTS

| | | | |
|---|---|---|---|
| 431890 | 7/1975 | U.S.S.R. | 210/96 R |
| 279581 | 12/1975 | U.S.S.R. | 210/96 R |
| 567462 | 8/1977 | U.S.S.R. | 210/96 R |

*Primary Examiner*—Benoit Castel
*Attorney, Agent, or Firm*—Benasutti Associates, Ltd.

[57] ABSTRACT

A novel mobile system for cleaning and processing catch basin and/or lagoon waste products is described wherein the degree of waste product dilution is carefully controlled prior to transmission to a mobile dewatering truck. The truck comprises dewatering apparatus which is uniquely controlled to produce a substantially dry land fill suitable end product and water suitable for recirculation or environmentally acceptable discharge to a process head or sanitary sewer.

25 Claims, 3 Drawing Figures

CATCH BASIN PROCESSING APPARATUS

CROSS-REFERENCE TO RELATED APPLICATIONS

This application is a continuation-in-part application of application Ser. No. 812,483, filed July 5, 1977, entitled "Catch Basin Apparatus And Method", which is a continuation of application Ser. No. 709,566, filed July 26, 1976, now U.S. Pat. No 4,040,960 entitled, "Mobile Processing Apparatus", which applications are incorporated by reference as if specifically set forth herein.

BACKGROUND OF THE INVENTION

The present invention relates to the handling of thick, viscous or thixotropic materials, and more particularly to the reclamation from storage lagoons of dry, semi-dry or nearly gelatinous sludge produced as a by-products of various manufacturing operations and/or various conventional waste sludge or sewage treatment processes.

Although the actual chemical composition of the materials to be removed from catch basins or lagoons will vary from location to location, normally such materials have been deposited in a liquid or semi-liquid state and have been stored in such lagoons or catch basins for a considerable period of time, which storage results in the thickening of the material due to decreasing moisture content. Moisture content may range from about 99.5% to as low as 60%, but commonly in the range of 92% to 85% after several years of aging in the lagoon. As described in U.S. Pat. No. 3,796,658, at this common moisture level, the sludge does not behave as a fluid, but rather, resembles a heavy viscous or soft gelatinous material having thixotropic tendencies.

The problems which are encountered in cleaning lagoons or catch basins of this type are aggravated by the fact that (depending upon the constituency of the waste products disposed therein) chemical reactions, microbic growth, local geologic characteristics including soil porosity and water table levels, and the particular design and construction of the lagoon or catch basin to be cleaned result in extremely discontinuous deposits of materials to be removed. For example, depending on exposure, porosity, dwell time in the lagoon, the varying nature of the substances charged into the lagoon from year to year, and many other factors, the consistency and handleability of waste material to be removed from within any given lagoon, much less from one lagoon to the next, will vary markedly by depth and region.

Conventionally, lagoons, catch basins and similar installations have been brought from the dry, semi-dry or gelatinous state to a pumpable state by injecting fluid such as water into the material in order to increase the moisture content of the material to a point where the material is pumpable, at which time a conventional pumping apparatus is utilized to pump the resultant sludge to rail tank cars or trucks. It may then be removed from the lagoon for transport to a suitable dump site or other disposal facility. As further described in U.S. Pat. No. 3,796,658, it is not practical to attempt to pump even gelatinous or semi-liquid sludge which does not flow evenly since a pump placed in the sludge simply pumps out a small area or cavity and ceases to receive additional input after the immediately adjacent material is removed. Adding water to the sludge reduces the aforementioned flow and pumping problems to some extent, but the increased total weight and volume of the resulting material increases shipping and disposal costs. Since the material in the lagoons has normally lost moisture and thickened with age, it is desirable to transport the material in a thickened condition or with the addition of only the minimum amount of water necessary to facilitate pumping.

U.S. Pat. No. 1,331,239 illustrates an early portable pumping apparatus intended for use for the evacuation of cesspools, dumps, basins or depressions or excavations in which the character of the contents is such that they should not pass through the pump without partial separation of the solids contained in them. A multi-chambered settling tank is utilized in order to allow liquids to be separated from the collected solids and to be sprayed as desired. See also, U.S. Pat. No. 1,344,710 which appears to disclose an improvement over the device disclosed in U.S. Pat. No. 1,331,239 wherein water which has been separated from the solids is recirculated into the catch basin 3 and is used to supply ejector 4. A similar system appears to be disclosed in U.S. Pat. No. 1,343,471. Although a travelling apparatus for cleaning sewer basins and the like disclosed in these three patents first became known in approximately 1920, the method disclosed therein for cleaning catch basins and the like has not changed substantially in the intervening 57 years. See, for example, U.S. Pat No. 2,753,877 dated July 10, 1956 which discloses injection of water into a sandpit to agitate the sand into a suspension and subsequent pumping of the suspension into a settling tank in which the sand is allowed to settle out and the water recirculated for subsequent use to further agitate material contained within the basin.

Also note U.S. Pat. No. 3,262,571, dated July 26, 1966 wherein a mobile unit is disclosed for use in cleaning out catch basins and the like. The specification of this patent states:

"In cases where the debris is substantially dry, the eduction unit deposits a fluid into the sewer or catch basin in order to loosen the debris and to mix it with a fluid so that it will be easily sucked up by the education unit. The mixture is deposited in the settling tank where the heavier debris falls to the floor. The fluid with the lighter debris in suspension passes through a series of baffles and/or strainer so that the lighter debris is removed from the fluid. The fluid which is now relatively free of debris may be redeposited into the catch basin and reused to loosen the mix with additional debris. Thus, the fluid is recirculated. An example such as the education unit is shown in U.S. Pat. No. 2,010,538, dated August 6, 1935."Specification U.S. Pat. No. 3,262,571 column 1, lines 17–30.

While relatively sophisticated methods have been developed in order to process conventional sludge at treatment plants, such instrumentation has not been applied to dewatering and/or treating materials collected during cleaning catch basins. While it might initially appear that a system such as that disclosed in U.S. Pat. No. 3,630,365 might be directly applicable to the art of catch basin or lagoon cleaning, such systems are intended to be used to process conventional sludge which, in comparison to catch basin waste materials, is an extremely homogeneous material of known constituency and chemical and/or bacterial composition. Additionally, such systems are fed with a fluid sludge containing a relatively small solids content thereby enabling the construction of a system which is efficient for its intended purpose, but which could not adequately process waste materials as directly collected from conventional lagoons or catch basins. Other patents generally disclosing systems, methods and equipment for processing sewage sludge and similar types of waste are U.S. Pat. Nos. 3,045,827, 3,275,547, 3,248,323, 3,226,317, 3,732,697, 3,720,608, 1,696,014, 2,228,017, 3,577,341, 3,739,912, 2,120,658, 2,391,494, 2,359,748, 3,879,285, 3,800,952, 3,979,296 and 4,019,431.

Other patents disclosing the use of a settlement or recirculation concept include U.S. Pat. Nos. 1,873,598, 3,317,049, 2,240,049, 2,240,167 and 3,616,917.

Subsidiarily, many processes and/or chemical reagents have been developed which are useful generally in combination or as a part of various dewatering processes. See, for example, U.S. Pat. Nos. 3,300,407, 3,897,333, 3,849,307, 3,409,546, 3,514,398, 3,720,609, 3,841,102, 3,899,419, 3,907,677 and 3,806,450.

SUMMARY OF THE INVENTION

The present invention provides a novel catch basin cleaning system wherein various means are provided which transfer material obtained from the catch basin to subsequent processing operations only in the event that the material is determined by various monitors to be of an optimal nature for introduction into the subsequent process phase. For example, the pumping means will transfer materials to the equalization means only if that material contains a preselected percentage of solids, which percentage is selected for its compatability with the subsequent processing means which are mounted on an adjacent mobile apparatus. Additional means are provided to insure that a maximum flow of material will be produced. For example, ejectors are used in combination with novel optimal pumping, monitoring and recirculation means in order to insure that the liquid which is collected from the catch basin has neither too little or too great a solids content for subsequent equalization and dewatering operations. In the event that a liquid is being pumped by the pumping means which contains the optimum solids content, this liquid is admitted to a subsequent equalization process which equalizes, mixes and homogenizes the collected material for subsequent treatment. Dewatering, treatment, conditioning and discharge follow equalization and interact to produce the desired end products.

The dewatering means comprises a dewatering device to separate the input material into at least liquid and thickened portions. Before entering the dewatering device, the moisture content of the input material is measured, e.g., by monitoring with flow and density sensing meters. The liquid-portion output of the dewatering device is similarly monitored and together with the information obtained for the input material is used to determine the moisture content of the thickened-portion. The dewatering device and other parts of the system are, during most phases of the operation, controlled to optimize the moisture content of the thickened output (cake) to be suitable for land fill purposes. The dewatering device can be any of a number of commercially available devices known in the sludge and water treatment art, as e.g., a centrifuge. In the preferred embodiment, however, a belt filter press is used as for example, those disclosed in U.S. Pat. Nos. 3,459,122, 3,800,952, 3,979,296 and 4,019,431 each of which patents are incorporated herein by reference. The dewatering device is used in combination with a chemical or polymer feed means and/or recirculating means to recirculate at least a portion of the thickened output of the centrifuge etc. back to earlier stages of material processing. Water suitable for return to the process head or sanitary sewer may be produced. Alternatively, water may be recirculated to be added directly into the ejector system, the catch basin, or to dilute the material which is being collected by the pumping system. Finally, the liquid portion may be used to supply the belt wash stream (when a belt filter press is used) (hereinafter referred to as the belt stream), providing the liquid portion is of suitable composition.

Throughout the process, material which is collected from the catch basin, hereinafter referred to as the wash effluent or the wash stream, is monitored qualitatively and quantitatively at numerous stages in the process. By monitoring the nature and quantity of this flow, the level of the equalization means, the flow rate and density of the dewatering means input, the liquid portion solids-density or turbidity, flow rate, and/or pH; various valves are automatically operated which regulate the bypass of the wash effluent back into the catch basin, the flow of material to the equalization means, the flow of thickened material either to the conditioning means or again to the equalization means, the flow of liquid effluent to the process head, belt stream and/or ejector, the amount of virgin water added to the pumping means and/or belt stream, and the rates of the pumping means, dewatering means, treatment (chemical feed) means and conditioning means, and perhaps most importantly, the qualities of the cake and liquid outputs from the dewatering device.

As a result, the present system is capable of adapting superior dewatering equipment to the art of catch basin cleaning which, heretofore, has relied upon settling tank type processing in order to collect and then transport materials removed from catch basins.

Accordingly, the primary object of the present invention is the provisional novel means for controlling a dewatering device to optimize the quality of the solids (thickened portion) and/or liquid outputs thereof to provide suitable land-fillable end products and/or liquid suitable for introduction into a sanitary sewer.

Another object of the present invention is the provision of an economic and effective apparatus for cleaning catch basins, lagoons, ponds, digesters, tanks, pipelines and sedimentation basins.

A further object of the present invention is the provision of a high flow rate, high through-put mobile processing apparatus capable of proceeding easily from one site to the next.

A cleaning apparatus is provided which greatly reduces the columes of pressurized cleaning water added or required to clean a given catch basin.

Another aim of the present invention is the feedback control of a belt filter press.

A further aim of the present invention is the dewatering of a maximum amount of material while optimizing the amount of polymer or other conditioning agents added during the dewatering process.

A further aim of the present invention is to significantly reduce the volume of waste to be transported and disposed of.

Another aim of the present invention is to determine the volume and moisture contents of the waste to be transported.

A further aim of the present invention is to produce a material which is physically or chemically acceptable for disposal. These and other objects of the present invention will become apparent from the following more detailed description.

DETAILED DESCRIPTION OF THE DRAWINGS

Although specific forms of the invention have been selected for illustration in the drawings, and the following description is drawn in specific terms for the purpose of describing these forms of the invention, this description is not intended to limit the scope of the invention which is defined in the appended claims.

The catch basin cleaning system of the present invention generally comprises a pumping means, equalization means, chemical feed (treating) means, dewatering means (such as a belt filter press), cake (thickened portion) conditioning means, centrate (liquid portion) treating means, cake disposal means, and water supply means, each of which means coacts with the other means to produce a maximum through-put rate of materials suitable either for recirculation or disposal, depending upon the particular phase of the cleaning cycle.

Figure 1:
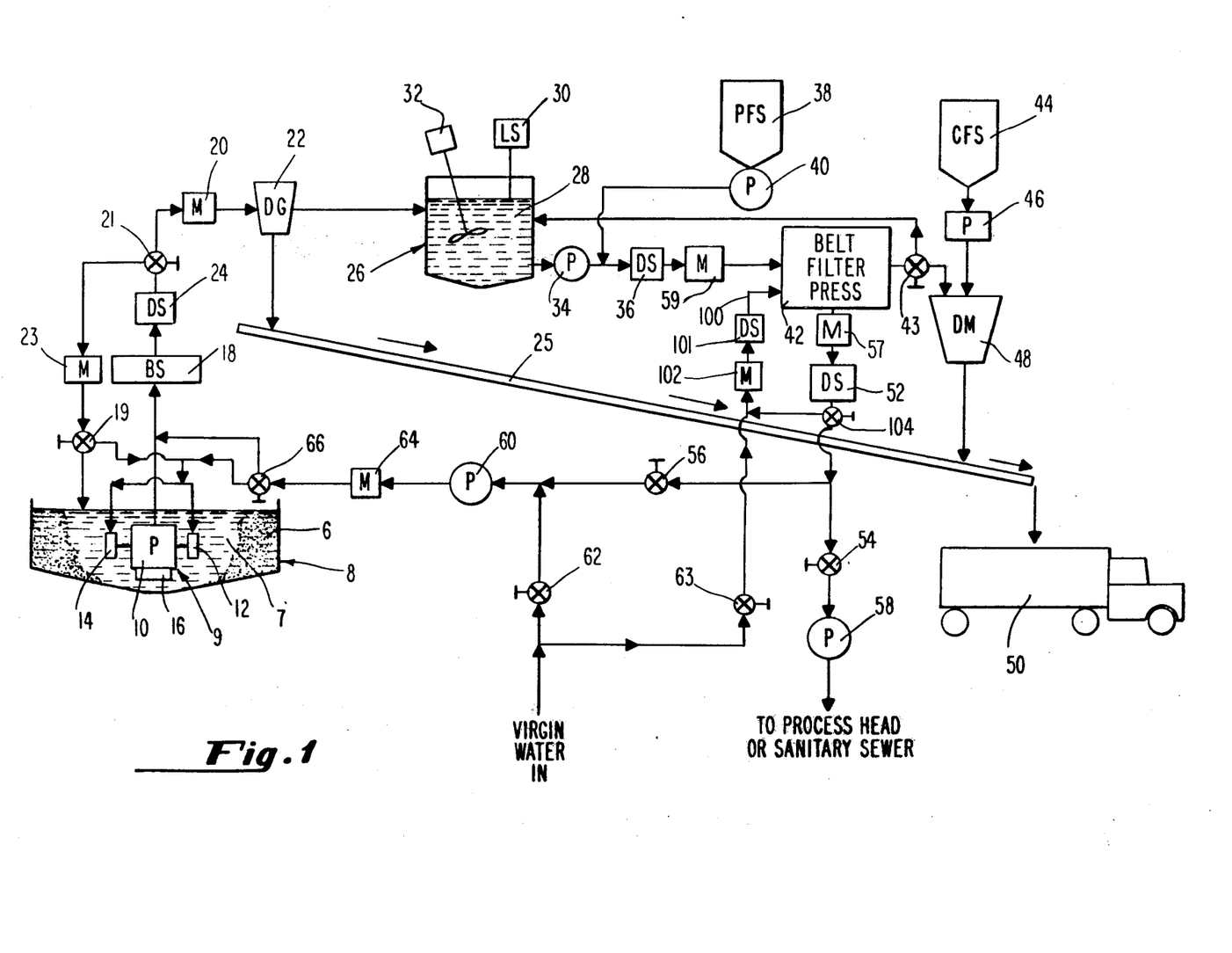
FIG. 1 is a schematic view of the catch basin processing system of the present invention.

Referring now to FIG. 1, a catch basin designated generally 8 is illustrated which is substantially filled with solid material 6 and semi-solid material 7 which may already have been subjected to a certain degree of water addition in accordance with the present invention. Shown disposed within the catch basin in the semisolid or liquid portion 7 is the catch basin pumping means of the present invention which comprises a catch basin pump 10, a comminutor 16 and ejectors 12 and 14. This catch basin pumping assembly is designated generally 9 in FIG. 1. The ejectors 12 and 14 function in a relatively conventional manner to inject liquid material such as virgin water to homogenize and increase the moisture content of the material in the vicinity thereof for subsequent pumping by a catch basin pump 10. The ejectors 12 and 14 are shown supplied by liquid lines which will be discussed more fully hereinafter.

The output of the catch basin pumping assembly is directed into the pumping system shunt assembly which generally comprises a bar screen 18, a density sensor 24, a shunt flow rate monitor 23, and ejector bypass valve 19, and a shunt valve 21. The output from the pumping system therefore is subjected to a coarse straining operation by the bar screen 18 and then is monitored by the density sensor 24 which monitors the percentrage of solids in the material collected by the pump 10 to determine whether the liquid contains an optimum degree of solids to be passed on to the remaining portions of the system. In the event that the solids content is lower than desired, and further in the event that the function of this density sensor 24 is not overriden by other sensors in the system, as will be described more fully hereinafter, shunt valve 21 operates to shunt the material collected back through shunt flow rate monitor 23 and ejector bypass valve 19 to be fed back into ejectors 12 and 14. As will be discussed more fully hereinafter, if the density sensor 24 senses too high a percentage of solids in the material collected by pump 10, it will be either open dilution valve 66 of the water addition system in order to reduce the solids content of the material collected or, alternatively, in the event that the remaining portions of the system can not handle the material collected from the pump, chunt valve 21 will be operated to again divert the material collected through the shunt flow rate monitor 23 and through ejector bypass valve 19 directly back into the catch basin. While the normal position for the ejector bypass valve 19 will be to direct the flow of materials bck into the ejectors 12 and 14, in the event that the material to be returned to the catch basin contains too high a percentage of solids to effectively travel through the ejector mechanism 12 and 14, or alternatively, in the event that the ejectors are already being supplied with their maximum handling capacity of liquids, as determined by water addition flow rate monitor 64, then ejector bypass valve 19 will operate to return the shunted material direclty into the catch basin.

As may be seen from the above description, the pumping means is a self-regulating system which is intended to produce pumpable material within a desired solids range and which is responsive to information received from both the water supply means and the equalization means in order to provide an optimum through-put through the system. In light of the above description, the function of the pumping means may be described as follows: the pumping means accomplishes the washing and moving of solids and sludges to the input of the pump 10 by using a presurrized wash-water stream which agitates solids into a pumpable suspension. Pressurized washing is achieved by use of high pressure water jets attached to a standard centrifugal, submersible pump in the preferred embodiment. In this preferred embodiment, the jets or ejectors 12 and 14 rotate through a $4\pi$ solid angle under power of water passing through an internal jet water turbine system. The pressures used can range to 500 psig generating (in the case of high flow rate) significantly higher forces than can be handled manually, as in the case in current practice. The high pressure generates a velocity head with high kinetic energy which partially substitutes for the high volume of wash water used in current practice. Kinetic energy is used to achieve particulate suspension and pumpable flow. Preferred jets or ejectors 12 and 14 may be produced by modifying jets supplied by the Gamlen Chemical Co. under the trademark GAM-A-JET TM II.

Also as described above, the flow to the ejectors 12 and 14 is controlled by density sensor 24 and other portions of the system such as the water addition system which similarly control a variable speed pump motor which modifies the output of the ejectors 12 and 14. The flow rates in the jet or ejector lines may be determined either by flow meters 23 and 64 or by additional magnetic flow meters disposed within the ejector assemblies 12 and 14. This controlled feedback loop minimizes the addition of water added during the cleaning process to thereby minimize the amount of dewatering necessary at later stages in the processing of collected materials.

In addition to the above described functions, the pumping means, and more particularly the pump system shunt, provides a filtering of large, coarse and abrasive materials and particulates (including grit, fibers, plastics, and particles larger than approximately 250 microns in diameter) by using well-known filtering methods such as a bar screen, comminution and maceration.

In combination with grit removal by a degritter 22 which may comprise standard internal separators such as hydrocyclones or rotary screens, these filtering methods remove and retain solids as will be described more fully hereinafter. Size reduction is also accomplished at the inlet suction part of the main washings submersible catch basin pump 10 by the use of an integral cutter disc as may be purchased with a Midland ABS submersible pump, or by the use of a continuous, mechanical self-cleaning filter such as one currently marketed under the trademark "THE AQUA GUARD", which is a screen supplied by Dyneco. The comminutor 16 may be one such as marketed by Franklin Miller, Inc. under the trademark DELUMPER$_{TM}$ or marketed by Dorr-Oliver, Inc. under the trademark GORATOR$_{TM}$, or marketed by Robbins & Meyers under the trademark MOYNO$_{TM}$ "MAZ-O-RATOR". The cleaning residues comminution which is required for the mechanical separation of liquid or solid fractions is achieved preferably before the cleaning flow enters the system. Therefore, the comminuting device 16 is attached to the suction input of the submersible catch basin pump 10 in the preferred embodiment. This will also serve to reduce washings volume by reducing or eliminating the need to back flush this pump. Back flushing may, of course, be attained by opening valve 66 and closing valves 21 and 19 in order to allow the water addition system to back flush the submersible pump 10.

Once a determination has been made that the material collected by the pump 10 and passing through the density sensor 24 is of a density suitable for further processing, shunt valve 21 will be operated to allow all or any portion of the material collected to pass through equalization means flow rate monitor 20 into the equalization tank. The equilization means generally comprises the equalization system flow rate monitor 20, a degritter 22 (as mentioned above), a grit conveyor 25 and equalization tank 26 containing slurry 28 therein, a level sensor 30 and an agitator 32. The equalization means flow rate monitor 20 in combination with the shunt flow rate monitor 23 will determine the rate of material actually being collected by the pump 10. Depending on the processing speed of the dewatering and subsequent operations following the equalization means, it may be necessary to increase the flow rate of material into the equalization tank, as monitored by equalization system flow rate monitor 20, in order to insure that an appropriate slurry level within the equalization tank will be maintained. In order to increase the flow rate of material into the equalization system, the equalization system flow rate monitor 20 is adapted to operate shunt valve 21, sewer valve 54, virgin water valve 62 and dilution valve 66, a suitable balance of which will always insure sufficient flow into the equalization system to prevent the slurry 28 within the equalization tank 26 from falling to an unacceptably low level.

As discussed above, grit removal is accomplished by a degritter 22 which is a standard initial separator such as a hydrocyclone or rotary screen. The removed solids are retained in the grit hopper and merged with the dewatered, conditioned cake output by grit conveyor 25. Other solids, after size reduction, remain in the wash process stream and become part of the solid, freshened cake at a later point in the process.

The purpose of the equalization means is to equalize and homogenize the flow to the dewatering means by using an in-line flow equalization basin 26. The flow equalization unit serves to dampen washing process flow variations thereby avoiding disruptions in the separation/dewatering process due to sudden flow changes, and helps to achieve a nearly constant flow rate to the separation or dewatering system. It is believed that this approach is far superior to side-line equalization, particularly when used in combination with the novel pumping system described above. In order to achieve further uniformity in suspended solids concentrations within the equalization tank, a mechanical mixer or agitator 32 is utilized such as a turbine flocculator. The equalization tank 26 should be selected to be of a volume equal to approximately 10 times the unit accumulation for the process in GPM. In the preferred embodiment, the GPM valve is approximately 200, thereby indicating in the preferred embodiment that accumulation per unit time is 200 gallons and the basin volume will be approximately 2,000 gallons, or 266 cubic feet.

The level of tank 26 is preferably indicated by a continuous, proportional control signal generated by an ultrasonic transducer. Such a transducer is marketed by Inventrox Industries, Inc. The input pumping rate to the equalization tank is monitored by equalization system flow rate monitor 20 and will, of course, be affected by the through-put of the submersible pump 10, head losses through screens, degritters, and piping. Flow rate control is achieved by variable speed pumping, flow control is achieved by variable speed pumping, flow control valves and/or valving which bypasses the pumping effluent back to the catch basin being cleaned, as described aforesaid. While a preferred range of solids in the wash stream will be selected for, which is typically between 2 and 4% solids, the system is designed to accept a wider range of solids content, i.e. 0.25% to 6% solids or even up to the maximum pumpable solids percentage in order to achieve efficiency in the system and to insure that the dewatering means is not required to shut down. In particular, as the level of slurry 28 within the equalization tank 26 falls below a certain preferred level, the logic circuitry associated with density sensor 24 will allow a lower solids content wash stream to pass by shunt valve 21 into the equalization system. Conversely, when optimal levels of slurry 28 are maintained in the equalization tank 26, only wash water additions containing optimal solids contents will be admitted into the equalization system. In accordance with the preferred embodiment of the present invention, the dewatering device density sensor 36 will additionally act as a feedback mechanism to monitor the density of material which has been pumped by pump 34 from equalization tank 26 into the dewatering device 42. In the event that the material within the equalization tank 26 is not of a preferred density, density sensor 36 will additionally coact with logic circuitry associated with density sensor 24 in order to permit materials to pass through shunt valve 21 into the equalization system, which will have the effect of counterbalancing the solids content in the equalization tank 26. That is to say if the material or slurry which is passing through the density sensor contains too little solids for optimum dewatering efficiency, then the density sensor 36 will coact with density sensor 24 to allow materials collected by the pump 10 to pass into the equalization system if the density of those materials is such that they will tend to thicken the material contained in the equalization tank. By the same token, if the material contained within the equalization tank 26 is too thick, i.e. has too great a solids content, valve 66 may be utilized in order to insure a lower solids input into the equalization system.

Generally, the material contained in a catch basin comprises slimes, greases, sediments, precipitates, slurries muds, scums, sludges and suspensions which together may be considered to comprise solid and liquid fractions which, as discussed above, may be expressed in a percentage in terms of weight. Within the liquid fraction of the material collected, four different types of liquid can be identified:
1. free liquid
2. floc liquid
3. capillary liquid
4. particle liquid Free liquid is not attached to sludge solids in any way and could be removed by simple gravitational settling as discussed in connection with the prior art processes preveiously applied to catch basin cleaning. Floc liquid, on the other hand, is trapped within the flocs and travels with them. Its removal is possible by mechanical dewatering such as by a centrifuge as will be discussed more fully hereinafter. Capillary liquid adheres to the individual particles and particle liquid is chemically bound to the individual particles. Accordingly, the system of the present invention further comprises a dewatering means, a treating or polymer feed means, cake disposal means, and water supply means adapted to adequately handle each of these four types of liquid.

The dewatering means comprises a dewatering device such as a belt filter press 42, a polymer or chemical feed means such as polymer feed system 38 with pump 40, dewatering device shunt valve 43 with its return line to the equalization tank 26, and a belt stream means 100 for supplying belt wash liquid to the dewatering device when needed. A dewatering device 42 receives the waste containing wash stream after the equalization process, and functions to continuously separate the wash stream into at least liquid and thickened portions. In the preferred embodiment, the input to dewatering device 42 is monitored by input flow meter 59 and input density sensor 36, the information gathered by which is combined to calculate the masses of solids and water per unit time time of wash stream material which is fed to the dewatering means 42. Similarly, the belt stream input to the dewatering device is monitored by belt stream flow meter 102 and belt stream density sensor 101 to determine the masses of solids (if any) and water per unit time of the belt stream which is input into the dewatering device and which ultimately may comprise a component of liqud portion. In those units (not shown) where the belt stream outputs separately, the belt stream output may be separately monitored in a manner similar to the liquid portion output. Finally, "output" flow meter 57 and "output" density sensor 52 monitor the liquid output of the dewatering means. These output sensors in combination, determine the masses of solids and water per unit time of the liquid portion which is output from the dewatering device. From this information and the information previously determined concerning the solids content of the wash stream and belt stream inputs, the moisture and/or solids content of the thickened portion or cake output of the dewatering device is easily computed. By subtracting the solids values which remain in the liquid portion after dewatering from those determined prior to dewatering, these figures, and thus the characteristics of the cake, are easily determined and may, in fact, be represented as a percentage solids or moisture of the output cake. No direct attempt to monitor the moisture and/or solids content of the thickened portion (cake) output of the dewatering device is necessary since this output may be in a solid, semi-solid, or liquid state and, therefore, may be difficult to monitor directly for moisture content.

Where characteristics of the thickened output, such as mass of moisture per unit time, mass of solids per unit time, percent of solids, a mass of material per unit time are simply to be approximated, an alternate device may utilize only a density sensor on the wash stream input and flow meters on the wash stream input and liquid output (assuming for this example the belt stream is not combined into the liquid effluent). In this case the solids content of the effluent (liquid portion) is ignored as are flow and solids variations caused by the belt stream. Nonetheless, where relatively efficient dewatering is obtained these characteristics for the thickened portion may be adequately approximated from the information determined by these sensing means.

Dewatering can be carried out by a variety of commercially available devices utilizing techniques such as vacuum filtration, centrifugation, pressure filtration, moving screen concentrator, belt pressure filtration, capillary dewatering system, or rotary gravity concentrator. Separation by centrifugation, and particularly by solid-bowl centrifugation, is suitable for mobile, truck mounted operation, and is flexible and easy to use with a continuous feed operation. In this case, the speeds of the bowl and scroll components of the centrifuge are directly controlled by the above described input and output sensors to minimize blade abrasion, particularly under high solids input conditions, while still providing outputs consistent with the particular phase of the process cycle.

Figure 3:
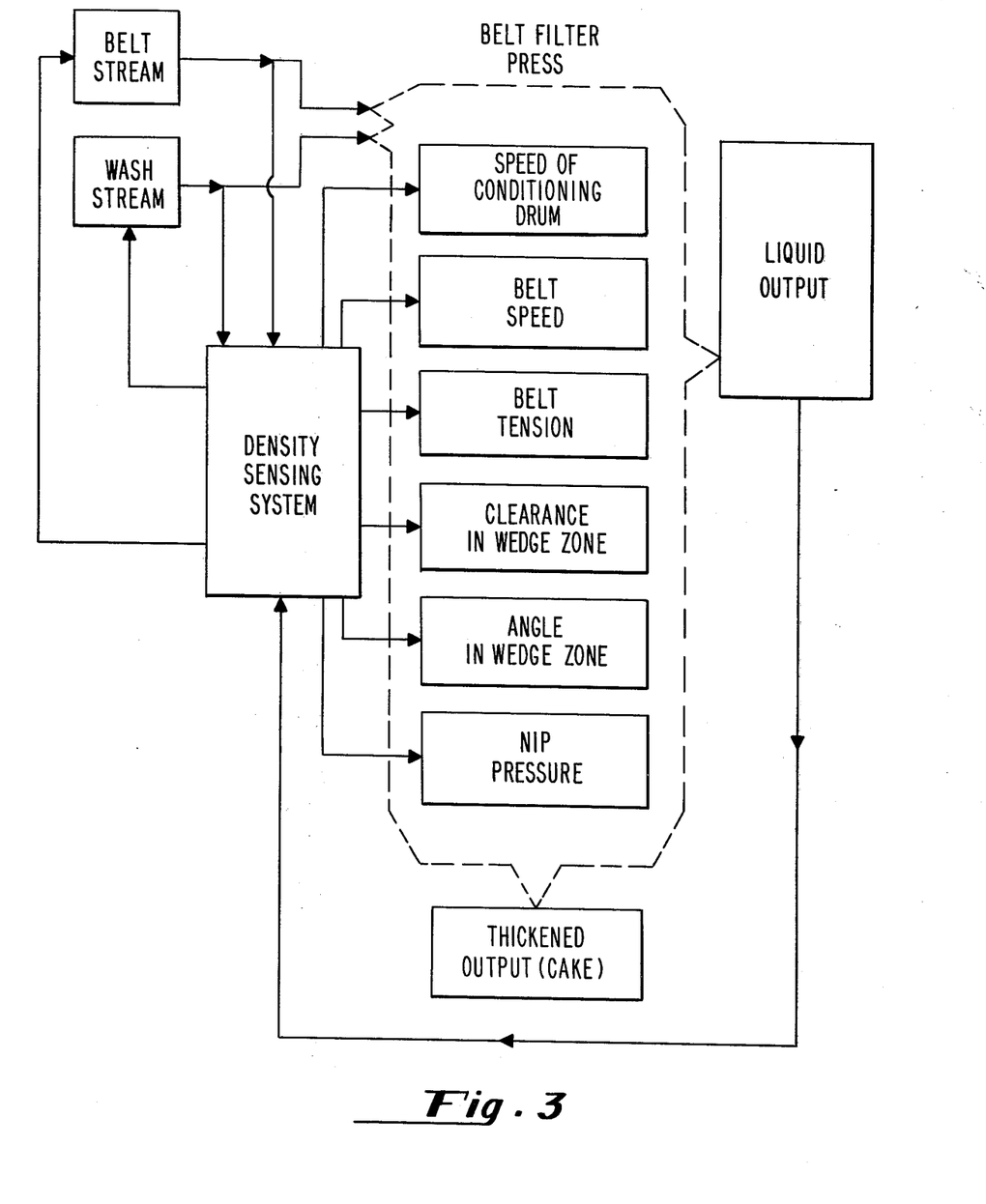
FIG. 3 is a diagrammatic flow chart illustrating the feedback control system of the present invention for a standard belt filter press.

In most cases, pressure filtration is preferred, using for example a belt filter press. The information from the flow meters and density sensors in the input and liquid output of the dewatering device in this instance is used to automatically control various parameters of belt filter press operation. Preferably, the belt speed, roller pressure belt tension, speed of conditioning drum (where polymer addition takes place), clearance in the wedge zone, angle in the wedge zone, nip pressure, and/or belt stream characteristics are varied to achieve optimum qualities in the thickened portion or cake output of the dewatering device. In FIG. 3, the feedback control of these components of a belt filter press is illustrated. The density sensing means will be seen to collect information from the belt, wash and liquid output streams and to control the various enumerated belt filter press components in response thereto to optimize the desired characteristics of the liquid and thickened outputs. The liquid-portion output may be similarly controlled for recycling to the sanitry sewer or head of the process stream associated with the catch basin being cleaned, depending upon the particular cycle phase. As with the centrifuge, providing these controls also allows the press to be adjusted for optimum operation, for example by optimizing wear when suitable cake is obtainable under these conditions. Similarly, polymer addition may be minimized by determining the point at which optimum separation is achieved, thereby minimizing polymer cost and usage.

As described above, in the event that the liquid portion is not to be discharged but rather to be recirculated, the system will be controlled only for desired thickening consistent with suitable disposal processes. The combination of the flow meters and density sensors associated with the dewatering device 42 provides a moisture sensing means for measuring the moisture content of the thickened portions as well as the wash stream input portion and liquid output portions. Similarly, with appropriate control circuitry cooperating with the various sensors a control means responsive to the moisture sensing means is provided for continuously controlling the dewatering device to selectively affect the waste content of the liquid and thickened portions outputs.

Referring now to the treating or polymer feed means, a dry chemical feed system referred to in the drawing as a polymer feed system 38 and polymer feed system pump 40 is provided which adds conditioners and flocculents to the equalized wash stream before or during dewatering. Since this unit operation includes a holding tank for liquified or dissolved chemicals, is also constitutes a liquid chemical feed system. This system is a typical automatic dry polymer feed system such as described in the technology transfer publications: E.P.A. 625/1-75-003a, Process Design Manual For Suspended Solids Removal, January 1975, page 5–58. With respect to measuring the moisture content of the various portions entering and leaving the dewatering device, the amount of solid material added by the polymer feed system 38 may be accounted for, or, preferably, the location of flow monitor 59 and density sensor 56 is interposed as shown between the polymer feed system-wash stream junction and the dewtering device itself. Alternatively, these meters or other sensing means can be located elsewhere, provided they accurately reflect or can be adjusted to reflect the volume and solids (moisture) contents of the wash stream and liquid portions at their immediate input and output points from the dewatering device. To a great extent, activation of the chemical feed system 38 will determine the moisture content and other characteristics of the various portion entering and leaving the dewatering device 42. Accordingly, the moisture sensing means will preferably incorporate logic circuitry which will control the amount of chemicals injected into the wash stream by the polymer feed system 38, as well as controlling sewer valve 54 and liquid portion recirculation valve 56. Generally, at the beginning of the cleaning process, all of the liquid portion passing through the meter 57 and density sensor 52, to the extent not necessary to supply the belt system 101, will be reinjected into the catch basin by either injectors 12 or 14, or piped into the catch basin through shunt 61, or diverted to otherwise dilute the wash stream through valve 66. During this stage of the process, it is not necessary to control the turbidity or other characteristics of the liquid portion output within the same closely defined levels as will be necessary when the liquid portion is to be discharged to the process head or sanitary sewer. Consequently, the chemical or polymer feed system 38 may be less active during the initial portions of the cleaning process later in the process, it is anticipated that the catch basin will have been fully homogenized and that a sufficient amount of water will have been added so that the liquid portion will preferably be discharged to the process head or sanitary sewer through sewer valve 54. In this event, the turbidity and other characteristics of the water must be carefully monitored in order to satisfy environmental standards. It is, therefore, anticipated that when the sewer valve 54 is opened and the liquid portion recirculation valve 56 is closed, that more strigent turbidity requirements will be in effect necessitating increased addition of chemicals from the polymer feed system 38 which in turn will be controlled by information transmitted from the output density sensing means 52 to the polymer feed system 38 by appropriate control means or circuitry. This interrelationship results from the fact that the turbidity level is related to the zeta potential of colloids found in the washing stream. Therefore, the signal received from the moisture sensing means will help ascertain and regulate the amount of additives necessary to neutralize the zeta potential.

While output flow meter 57 and output density sensor 52 have been discussed above in connection with the monitoring of liquid portion (centrate) quality, it is well within the scope of the present invention to use other monitoring means in addition to the above meters for the purpose of qualitatively and/or quantitatively monitoring the liquid portion to determine the suitability of its disposal according to other parameters. For example, while turbidity is the most common measure of the suitability of a liquid for disposal, given the nature of the catch basin materials collected, it may be desirable to qualitatively monitor the liquid portion for other properties. For example, where the catch basin contained or was suspected to contain a relatively high proportion of heavy metal residues, the meters above could be supplemented by a pH monitor requiring a pH of approximately 11 or greater prior to disposal of the liquid portion in a process head or sanitary sewer. In this instance, the polymer feed system 38 would additionally comprise means for introducing treating agents, such as lime, into the wash stream prior to or during dewatering which would insure this relatively high liquid portion pH, thereby in turn insuring that heavy metals contained in the wash stream prior to dewatering would be converted into insoluble oxides or hydroxides of heavy metals and therefore that these heavy metal constituents will become part of the thickened portion of the wash effluent and subsequently will be incorporated in a dry cake for environmentally acceptable disposal. It may therefore be seen that the dewatering means of the present invention may further comprise a liquid portion sensing means for qualitatively sensing the nature of the liquid portion produced by said dewatering means. This liquid portion sensing means may also control a polymer feed or treating means for treating the wash effluent prior to or during dewatering by the dewatering means, and further may control that portion of the liquid portion which is recirculated to the catch basin.

In spite of the above described controls to optimize the density of materials to be introduced through the dewatering device 42, it is, nonetheless, contemplated that in some instances input from the equalization process will not contain a sufficient solids content to produce a suitable thickened portion or cake end product which may be disposed in an environmental manner. Therefore, depending upon the moisture content of the thickened portion output of the dewatering device 42, as determined by the input and output sensing means 59, 36, 57, and 52, the dewatering device shunt valve 43 is operable to shunt materials back into the equalization tank 26 so that the dewatering device 42 will act, in this instance, as a thickener and not as a cake producer. In this case, of course, the thickness or solids content of the slurry 28 within the tank 26, will be substantially increased in this mode, i.e., when the object of the process is to increase the density of the slurry 28 within the tank 26, the remainder of the pumping system will be adapted to feed only relatively dense materials into the equalization system unless, of course, the demand for materials within the equalization tank overrides the necessity to receive a relatively dense wash stream. It is therefore anticipated that the material which is allowed to be discharged into the dry mixer 48 from the dewatering device 42 will be controlled as to its moisture content so that, when desired, only a suitable dry cake material will be discharged from the dewatering process. As an alternative, it is possible to use the entire system only as a thickening system and to replace the dump trunk 50 with a tank truck such as might be desired when the resultant liquid sludge will be barged for disposal at sea. The shunt valve 43 behaves as a recirculating means for recirculating at least a portion of the thickened output portion back into the wash stream input to the dewatering device 42. The shunt valve can be adapted for automatic control in response to the moisture content of the thickened portion, as determined by the input and output, as described aforesaid.

In the preferred embodiment, the thickened portion issuing from the dewatering process through dewatering device shunt valve 43 into the dry mixer 48 will be conditioned by a cake or thickened portion conditioning feed system 44 and conditioner feed pump 46. The material will be conditioned with lime and other additives and will be deodorized and disinfected prior to disposal so that it will approximate soil and will have significant positive valve as soil cover in a sanitary land fill. This may be accomplished by use of a standard dry feeder bin system such as marketed by Vibra-Screw, Inc. under the trademark "LIVE BOTTOM BIN". Odor control and disinfecting chemicals such as lime, powdered carbon, and others will be added to cakes-residue by feeding both into a dry mixer 48 such as a standard cement mixer. The mixed, dry cake will be screw-conveyed to dump trucks 50 for disposal.

The preferred embodiment of the present invention will additionally comprise a water supply means which comprises a water addition pump 60, virgin water valves 62 and 63, a virgin water supply, a basin-water addition flow rate monitor 64, a dilution valve 66, shunt 61 and an input from the dewatering device recirculation valve 56 as described above. At the beginning of the process, of course, very little liquid will be present in the catch basin and it will be necessary to add virgin water through valve 62 and pump 60 to supply sifficient water to ejectors 12 and 14 to produce a pumpable suspension within the catch basin, designated generally 8, as well as, to supply belt stream 100 through belt stream flow rate monitor 102 and belt stream density sensor 101. Once this priming process has gotten underway, a greater amount of water required for the ejectors 12 and 14 will enter the ejectors through recirculation of the liquid portion output of the dewatering device 42 through liquid portion recirculation valve 56 and through shunt valve 21 and ejector bypass valve 19. It is anticipated during this phase of the process that virgin water will be necessary only to supply belt stream 100 (if the volume or density of the liquid output is insufficient to do so) and to replace the amount of moisture retained in the dry cake if this exceeds the amount of moisture originally present in the catch basin material to be processed. Shunt 61 allows an individual, for example, to hose down particular portions of the facility to be cleaned by using a hand-held nozzle. Near the end of the process, the solids within the catch basin 8 will have been brought to a fully pumpable state and it is anticipated that only a portion, if any at all, of the liquid portion need by recirculated through recirculation valve 56 and subsequently through ejectors 12 and 14 in order to maintain the materials in the catch basin in a suspension. During this portion of the cycle, sewer valve 54 will be opened and the sewer pump 58 will discharge that portion of the liquid portion not diverted by valve 104 to the belt stream to the process head or sanitary sewer. As a result of the above described process, it is anticipated that a large process head water tank will be sufficient to supply the entire water requirements for cleaning a moderate sized catch basin and that water will be lost from the overall system only by the amount that the moisture in the cake exceeds the moisture contained in the catch basin before cleaning starts. Alternatively, in the event that the catch basin moisture is relatively high, it is anticipated that water will actually be generated by the cleaning of the catch basin and will be available to the process head for industrial use.

Figure 2:
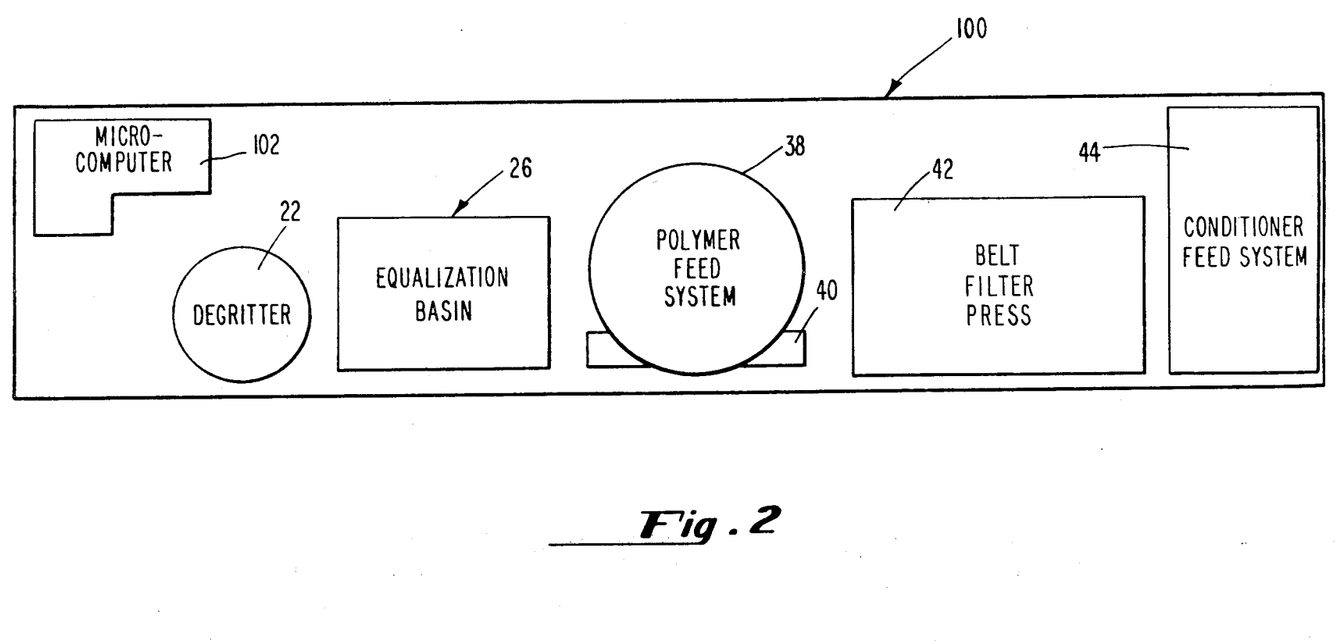
FIG. 2 is a diagrammatic top view representing a truck trailer in which certain equipment suitable for use in the preferred embodiment is shown disposed.

Referring now to FIG. 2, it may be seen that the present system accomplishes seven basic unit operations, i.e.:

1. washing and pumping
2. wash-water addition control
3. multi-staged comminution, screening and grit removal
4. residue flow equalization and control
5. residue conditioner and flocculent addition
6. dewatering or liquid/solid fraction separation and controlled recycling
7. solids conditioning prior to disposal It is anticipated that the equipment illustrated in FIG. 2 is easily mounted on a standard truck-trailer with the addition of monitoring and control systems which provide for automatic operation of the entire catch basin cleaning operation. The truck designated generally 100 is shown in FIG. 2 having disposed thereon a degritter 22, equalization basin 21, polymer feed system 38, pump 40, solid/bowl scroll centrifuge 42 as an example of a dewatering device and conditioner feed system 44. A micro-computer 102 is seen disposed in one corner of the trailer designated generally 100 which micro-computer generally comprises logic circuitry in association with the various sensors discussed above to facilitate operation of the equipment incorporated in the system as described above. It is understood that while a mini or micro-computer is preferred as a matter of economics, the particular logic functions described throughout this specification may also be suitably accomplished using standard binary logic circuitry, as is well known in the art.

The particular sub-systems used in combination in the preferred embodiment of the present invention, in addition to that already described, will be the standard type known to the art. Pumps, for example, with the exception of the modified centrifugal submersible pump 10 attached with comminution equipment for maceration and the attached mobile pressure washing jets, will be of the progressive capacity type for the residue and chemical feed pumps, and will be of the shear-sensitive metering polymer feed type for the polymer feed pump 40. The wash stream and liquid portion pumps will be standard centrifugal pumps, preferably open impeller or torque-flow (recessed impeller) type equipped with the variable speed drives. All pumps will have variable speed drives capable of remote control, as, for example, SCR drives. Solids, on the other hand, will be conveyed by conventional means such as standard screw or trough conveyors. If pumped, solids residue containing less than 30% solids by weight may be pumped into tank trucks or for recirculation into the equalization tank 26 by open throat pumps. Preferably, standard piping and hosing suitable for quick-disconnect coupling will be used to provide modular and flexible connections between unit opertions.

As seen from FIG. 2, it is not anticipated that during operation the entire catch basin processing system be mounted on a single trailer truck. Rather, it is anticipated that the pumping means including the shunt will be easily transportable around the job site and will be disposed in or in closer proximity to the catch basin so that a minimum of energy will be required in order to shunt unacceptable materials back into the catch basin as aforesaid. The equalization, dewatering, chemical (polymer) feed, conditioning and cake disposal means, on the other hand, are all generally located on a single mobile unit as illustrated in FIG. 2 and therefore may be easily trucked from site to site. Depending upon the particular location of the virgin water supply and/or the process head or sanitary sewer, it is contemplated that during operation the water supply means will be disposed either in close proximity to the pumping means or preferably in close proximity or as a part of the mobile unit illustrated in FIG. 2. In the latter instance, only two pipelines need connect the pumping means with the remainder of the system, namely the pipeline from the pumping means to the remainder of the system and the pipeline connecting the water supply means to the pumping means. It is therefore anticipated that the pumping means may work quite effficiently and effectively at distances which are remote from the site of the truck trailer illustrated in FIG. 2.

The final mobile unit which is a part of the catch basin cleaning system of the present invention is illustrated as dump truck 50 in FIG. 1 and a mobile unit easily adaptable for stationing in the vicinity of the truck trailer illustrated in FIG. 2. In the instance where a dry mixer 48 is a cement mixer, and is not contained within the unit illustrated in FIG. 2, then conventional equipment is employed in order to transfer matriel from the dry mixer 48 and the grit conveyor 25 into the truck 50.

It will be seen from the above discussion that the catch basin cleaning of the present invention is adapted for fast, efficient cleaning of the catch basin having a wide range of materials disposed therein which system accomplishes this cleaning with the following advantages:

1. water addition is minimized
2. the density of the cleaning pump discharge is maximized
3. the dryness of the wash residues is maximized in order to produce a land fillable cake or, alternatively, a thick slurry which represents a minimum volume for disposal
4. the quality of the liquid portion is optimized to thereby meet the requirements for recycling this centrate to the process head or sanitary sewer
5. polymer or other conditioning chemical addition is controlled at levels consistent with cake and effluent characteristics requirements. Hence, chemical costs are controlled or optimized.

Use of the above system will result in three to one or more reduction in waste transportation and disposal compared to current practice and will provide many environmental advantages in the transformation of large volume liquid wastes which now must be ocean or land dumped to smaller volumes of disinfected solid wastes suitable and desirable for sanitary land fill operations.

As used herein the term "water" is intended to refer to any primary carrier liquid in which solid may contained. The term "liquid portion" as used herein is intended to refer to the effluent of a dewatering device, which is primarily a liquid fraction but which may contain some solids therein.

It will be understood that various changes in the details, materials and arrangement of parts which have been herein described and illustrated in order to explain the nature of this invention may be made by those skilled in the art within the principle and scope of the invention as expressed in the following claims.

It will further be understood that the "Abstract of the Disclosure" set forth above is intended to provide a non-legal technical statement of the contents of the disclosure in compliance with the Rules of Practice of the United States Patent and Trademark Office, and is not intended to limit the scope of the invention described and claimed herein.

What is claimed is:

1. A cleaning system for dewatering a continuous wash stream containing variable quantities of solid wastes, comprising:
   (a) at least one dewatering means including inlet means for receiving said waste containing wash stream and outlet means for continuously separating said wash stream into at least liquid and thickened portions;
   (b) solids sensing means for measuring the solids content and flow of at least said wash stream and at least the solids content and flow of said liquid portion to determine the solids and moisture contents of the thickened portion; and
   (c) wash control means responsive to said solids sensing means for continuously controlling said dewatering means to selectively affect the characteristics of said liquid and thickened portions.

2. The invention of claim 1 wherein said dewatering means comprises a belt filter press.

3. The invention of claim 2 wherein said belt filter press comprises a belt of adjustable tension and said waste control means controls the tension of said belt filter press.

4. The invention of claim 2 wherein said belt filter press comprises an adjustable-speed belt and said waste control means controls the speed of said belt.

5. The invention of claim 2 wherein said belt filter press comprises a variable speed conditioning drum, and said waste control means controls the speed of said drum.

6. The invention of claim 2 wherein said belt filter press comprises means for producing variable clearance in the belt filter press wedge zone, and said waste control means controls the clearance in said wedge zone.

7. The invention of claim 2 wherein said belt filter press comprises means for varying the angle in the belt filter press wedge zone, and said waste control means controls the angle in said wedge zone.

8. The invention of claim 2 wherein said belt filter press comprises means for varying the nip pressure of said belt filter press, and said waste control means controls said nip pressure.

9. The invention of claim 2 wherein said belt filter press utilizes a belt stream to effect said separating, and said waste control means controls the characteristics of said belt stream.

10. The invention of claim 2 wherein said wash control means continuously controls means for selectively varying the characteristics of said continuous wash stream.

11. The invention of claim 10 wherein said means for varying the characteristics of said wash stream further comprises polymer feed means for selectively introducing polymer into said wash stream.

12. The invention of claim 2 wherein said belt filter press utilizes a belt stream to effect said separating of said wash stream into at least liquid and thickened portions, and wherein said solid sensing means further comprises means for sensing the solids and moisture contents per unit volume and volume per unit time of said belt stream to determine in combination with the solids and moisture contents per unit volume and volume per unit time of said wash stream and said liquid portion the solids and moisture content of said thickened portion.

13. The invention of claim 12 wherein said wash control means selectively effects the characteristics of said belt stream.

14. The invention of claim 1 wherein said dewatering device comprises a centrifuge.

15. The invention of claim 14 wherein said waste control means controls the scroll and bowl speed of said centrifuge.

16. The invention of claim 1 wherein said cleaning system further comprises a polymer feed means for providing conditioner to said wash stream.

17. The invention of claim 16 wherein said waste control means controls the output of said polymer feed means.

18. The invention of claim 1 wherein said dewatering means comprises recirculating means for recirculating at least a portion of said thickened portion back into said wash stream.

19. The invention of claim 18 wherein said waste control means controls said recirculating means.

20. A cleaning system for dewatering a continuous wash stream containing variable quantities of solid wastes, comprising:
(a) at least one dewatering means including inlet means for receiving said waste containing wash stream and outlet means for continuously separating said wash stream into at least liquid and thickened portions;
(b) solids sensing means for measuring the solids and moisture contents of said thickened portions, said solids sensing means comprising:
  (i) density sensing means for continuously sensing the density of said waste in said wash stream;
  (ii) flow rate sensing means for continuously sensing the flow rate of said wash stream;
  (iii) density sensing means for continuously sensing the density of said waste and said liquid portion; and
  (iv) flow rate sensing means for continuously sensing the flow rate of said liquid portion; and
(c) waste control means responsive to said solids sensing means for continuously controlling said dewatering device to selectively affect waste content of said liquid and thickened portions.

21. The invention of claim 20 wherein said dewatering means comprises a belt filter press, and said waste control means controls the tension and speed of said belt filter press.

22. The invention of claim 20 wherein said dewatering means comprises a centrifuge, and said waste control means controls the scroll and bowl speeds of said centrifuge.

23. The invention of claim 20 wherein said cleaning system further comprises a polymer feed system for providing conditioners to said wash stream, and said waste control means controls the output of said polymer feed system.

24. The invention of claim 20 wherein said dewatering means comprises recirculating means for recirculating at least a portion of said thickened portion back into said wash stream, and said waste control means controls said recirculating means.

25. A catch basin cleaning system for removing liquid, solid and semi-solid wastes from catch basins comprising:
(a) pumping means for injecting liquid under pressure into said catch basin to combine with and suspend wastes therein, and for removing waste containing liquids therefrom;
(b) equalization means for receiving said waste containing liquids from said pumping means and temporarily holding said waste containing liquids;
(c) dewatering means for receiving said waste containing liquids from said equalization means and for removing liquid from said waste containing liquids to produce at least a liquid and a thickened portion;
(d) water supply means for supplying liquid at least to said pumping means for receiving said liquid portion from said dewatering means;
(e) solid sensing means for determining the solids content of said thickened portion; and
(f) waste control means responsive to said solid sensing means for continuously controlling said dewatering means to selectively affect the waste content of said portions.

* * * * *